Nov. 7, 1967  W. H. MUTTERA, JR  3,351,515
ADHESIVE TAPE OR LABEL STRUCTURE HAVING A BARRIER LAYER
Filed July 5, 1962
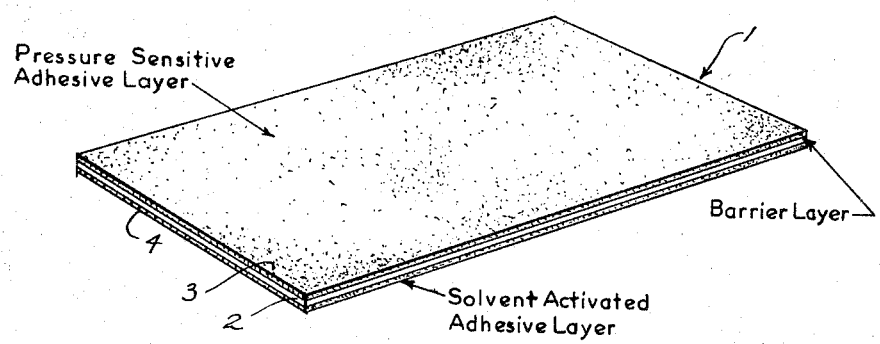
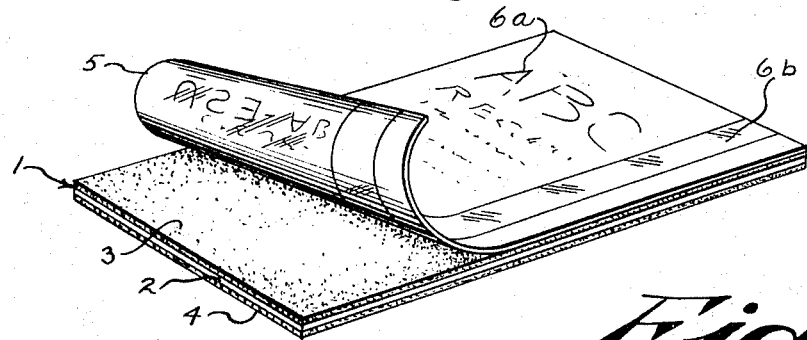
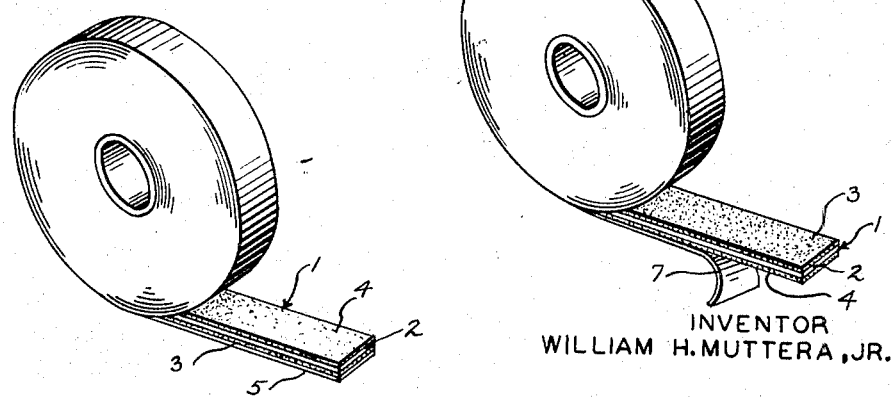
INVENTOR
WILLIAM H. MUTTERA, JR.
BY
ATTORNEY United States Patent Office 3,351,515
Patented Nov. 7, 1967

3,351,515
ADHESIVE TAPE OR LABEL STRUCTURE
HAVING A BARRIER LAYER
William H. Muttera, Jr., Mequon, Wis., assignor to W. H.
Brady Co., Milwaukee, Wis., a corporation of Wisconsin
Filed July 5, 1962, Ser. No. 207,511
2 Claims. (Cl. 161—167)

This invention relates to adhesive products such as label and tape constructions; more particularly, it relates to a label or tape construction including a top layer and a solvent-activated adhesive layer wherein the solvent-activated adhesive layer is separated from the top layer by a barrier layer to prevent the solvent used to activate the solvent-activated adhesive from reaching the top layer. In another aspect, this invention relates to a label or tape support member comprising a barrier layer having solvent-activated adhesive adherent to one of its surfaces and pressure-sensitive adhesive adherent to its other surface.

One object of this invention is to provide a composite label construction including a top layer and a solvent-activated adhesive layer wherein solvents used to activate the said adhesive layer are prevented from attacking and deleteriously affecting the top layer and any decoration which may be applied thereto. Another object of this invention is to provide a label support member including a barrier layer having a layer of pressure-sensitive adhesive adherent to one surface thereof and a layer of solvent-activated adhesive adherent to the other surface thereof which support member can be utilized to provide a composite label or tape by combining it with a suitable top layer.

Briefly, this invention provides a composite adhesive product including a barrier layer interposed between a solvent-activated adhesive layer and a top layer that is joined to the barrier layer by means of pressure-sensitive adhesive. The barrier layer is substantially liquid solvent impervious so that solvents used to activate the solvent-activated adhesive are prevented from reaching the pressure-sensitive adhesive or the decorated top layer to prevent softening of the pressure-sensitive adhesive and/or attacking the top layer.

The above-mentioned and other more specific objects will appear in the description to follow. In the description, reference is made to the accompanying drawings which form a part hereof and in which there are shown, by way of illustration, several specific forms in which this invention may be practiced. These forms will be described in detail to enable those skilled in the art to practice this invention but it is to be understood that other embodiments of the invention may be used and that structural changes in the embodiments described herein may be made by those skilled in the art without departing from the true scope of the present invention. The scope of the present invention is best defined by the appended claims and limitations set out in the following detailed description are not to be taken in a limiting sense except insofar as they are incorporated in the claims.

In the drawings:

FIG. 1 is a perspective view of a label support member constructed in accordance with this invention;

FIG. 2 is a perspective view of a composite structure formed by applying a decorated label to the label support member of FIG. 1;

FIG. 3 is a perspective view illustrating another form in which this invention may be practiced; and FIG. 4 is a perspective view showing still another form suitable for the practice of this invention.

Referring to FIG. 1, there is shown a label support member 1 comprising a barrier layer 2, a layer 3 of pressure-sensitive adhesive adherent to one surface of the barrier layer and a layer 4 of solvent-activated adhesive adherent to the other surface of the barrier layer. The term "adherent" as used herein and in the claims refers to the fact that the respective layers may not be readily separated from one another upon the application of usual hand or manual pressure as distinguished from the condition wherein materials may be easily peeled apart by hand. The barrier layer is to be of a substantially liquid solvent impervious material and may comprise a thin film or sheet of thermoplastic film-forming polymeric material. Materials suitable for the barrier layer include: polyesters, such as the condensation copolymer of ethylene glycol and terephthalic acid sold under the tradename "Mylar"; polyolefins, such as polyethylene, polypropylene and olefin copolymers; polycarbonate, such as that sold under the trademark "Lexan"; polyvinyl fluoride, such as that sold under the tradename "Tedlar"; and fluorocarbon polymeric materials such as the copolymer of tetrafluoroethylene and hexafluoropropylene.

The layer of pressure-sensitive adhesive is to be a layer of normally tacky pressure-sensitive adhesive of which there are many types well-known in the art. A typical suitable pressure-sensitive adhesive normally includes a rubbery film-forming material compounded with a suitable compatible tackifier and dispersed in an appropriate solvent. Other ingredients such as antioxidents, light stabilizers, color pigments, fillers, viscosity reducing agents to provide an adhesive of coatable viscosity, etc. may be included in the pressure-sensitive adhesive to provide or enhance particular properties. Typical useful rubbery materials include natural rubber, synthetic rubber, latex crepe rubber, rubbery synthetic polymers and copolymers, and the like. Rosin esters such as ester gum, wood rosin, phenol-aldehyde resins, terpene resins, and the like may be used as tackifiers. Aliphatic or aromatic hydrocarbon solvents are most often used with such adhesives.

The layer of solvent-activated adhesive is to comprise a layer of normally hard solvent-activated adhesive which becomes adhesively tacky upon the application thereto of a solvent. As opposed to a normally tacky pressure-sensitive adhesive, the normally hard solvent-activated adhesives generally use a harder tackifying resin which is often a heat-curable type material. In general, the normally hard solvent-activated adhesives will also include a rubbery polymeric material compounded with a suitable compatible tackifier in a solvent. There are many suitable formulas for a normally hard solvent-activated adhesive of the type useful with this invention and they need no extended description herein. After being applied, such adhesives dry to a hardened film upon evaporation of the solvent and are not tacky in their dried state. When it is desired to activate the adhesive, a suitable solvent is applied to render it adhesively tacky. The barrier layer of the label support member 1 is to be substantially impervious to the solvents used to activate the solvent-activated adhesive layer so that when the solvent-activated adhesive layer is rendered adhesively tacky upon the application of solvent, the activating solvent will not be able to pass through the barrier layer and attack the pressure-sensitive adhesive layer or a top layer adherent thereto.

A typical composite structure incorporating the label support member 1 is illustrated in FIG. 2 wherein a decorated top layer is applied to the pressure-sensitive adhesive layer of the label support member 1. The top layer 5 may be decorated as by printing, metallizing and the like on its undersurface contacting the pressure-sensitive adhesive layer and pressure-sensitive adhesive may be readily compounded from the ingredients which will not seriously attack such decoration. This decoration is shown schematically by the areas 6 in FIG. 2, 6a denoting a printed area and 6b denoting a thin metallized portion.

In a specific form of this invention, a web of "Mylar" polyester film, one-half mil thick, was coated on one side with a thin layer of pressure-sensitive adhesive applied at a coating weight sufficient to give approximately 20 pounds of solids per 3000 square feet of film area. The pressure-sensitive adhesive comprised, on a parts by weight basis, 100 parts natural crepe rubber and 100 parts hydrogenated rosin ester dissolved in 100 parts of heptane, together with 2 parts of a suitable anti-oxident such as that available under the trade name "Santovar A." The hydrogenated rosin ester used in this formula is "Staybelite Ester 10," which is a glycerol ester of hydrogenated rosin commercially available from the Hercules Powder Company that has an acid number of 10, a softening point of 80 to 88° C. determined according to the Hercules drop method and a specific gravity of 1.068 at 25/25° C. A solution of solvent-activated adhesive was then applied to the other surface of the barrier layer and allowed to dry to form a thin hard layer. The solvent-activated adhesive comprised, on a parts by weight basis, 100 parts natural crepe rubber and 90 parts of terpene phenolic resin dissolved in 600 parts of toluene, together with 2 parts of an anti-oxidant, "Santovar A." A top layer comprising a thin film of "Mylar" polyester film, one surface of which was decorated with printed portions and metallized portions, was then applied to the label support member with its decorated surface contacting the layer of normally tacky pressure-sensitive adhesive of the support member. When ready for application, a suitable solvent was used to activate the solvent-activated adhesive to render the same adhesively tacky for application to an object. Typical solvents useful for this purpose include toluene, methyl ethyl ketone, cyclo-hexanone, trichloroethylene, and the like.

This invention may be practiced in a variety of forms. Individual composite label structures comprising a label support member 1 and a top layer 5 may be provided. FIG. 3 illustrates a web of a composite adhesive product including a top layer 5 and a barrier layer 2 united by a layer of pressure sensitive adhesive 3 with a solvent-activated adhesive layer 4 adherent to the opposite surface of the barrier layer; as shown, this product may be wound on itself in roll-form. A web of a label support member 1 may also be supplied in roll-form without a top layer as illustrated in FIG. 4; in this form it is preferable to include a liner 7 that is release coated on both sides, such as release coated glassine, interleaved between abutting spiral rows of the web to prevent one row of the web from undesirably adhering to an adjacent row during storage. When supplied in this form, decorated labels or tapes may be applied to the pressure-sensitive adhesive layer of the label support member at any desired time. It will be also apparent to those skilled in the art that the composite adhesive products of this invention may be provided by uniting a web of decorated labels or tapes coated on one side with pressure-sensitive adhesive to the uncoated surface of a web of barrier film coated on its opposite surface with solvent-activated adhesive and it is expressly intended that this form be included within the scope of the appended claims.

It has been found that the provision of the barrier layer in a composite adhesive product according to this invention permits solvent-activated adhesives to be used in a label, tape or similar structure without deleteriously affecting decorated or undecorated top layers. Thus, the present invention permits the use of solvent-activated adhesives with decorated labels or tapes that would normally be undesirably attacked by the solvents used to activate solvent-activated adhesives, which solvents would impair the attractivness or legibility of the decoration applied to the top layer. Further, the provision of the barrier layer according to this invention also prevents solvents used in activating the solvent-activated adhesive from penetrating into the layer of pressure-sensitive adhesive and destroying its adhesiveness by rendering the same undesirably soft. This invention will thereby permit the use of solvent-activated adhesives together with decorated top layers in many applications where this would be impossible with the adhesive labels, tapes, or similar products presently known in the art. In general, solvent-activated adhesives exhibit a higher ultimate adhesion than pressure-sensitive adhesives and, in addition, they also enable the adhesive product to be moved slightly as it is being applied. This latter feature can be particularly valuable where a long narrow strip of the adhesive product is being put in place. However, in the past, decorated labels particularly those bearing printing and/or mirror smooth metallized portions have been generally available only with a layer of pressure-sensitive adhesive coated on one side. This is due to the fact that the solvents normally used to activate a solvent-activated adhesive will also attack or destroy the printing inks and metallizing used in such a decorated label. For this reason, therefore, it has not been generally possible prior to this invention to incorporate a decorated layer and a solvent-activated adhesive in an adhesive product thereby greatly inhibiting the use of decorated labels, particularly metallized labels, in applications where a solvent-activated adhesive is desired. For the reasons stated above, this invention will now enable the use of highly decorated labels, tapes and similar adhesive products in conjunction with a solvent-activated adhesive and thereby greatly extend the useful applications of decorated labels and the like.

I claim:

1. An adhesive product, such as a label, tape and the like, comprising: (1) a barrier layer of a thin sheet of substantially liquid-impervious thermoplastic film-forming materials, said barrier layer having two opposed surfaces, (2) a layer of normally tacky pressure-sensitive adhesive adherent to one of the opposed surfaces of the barrier layer, (3) a layer of normally hard, solvent-activated adhesive adherent to the other opposed surface of the barrier layer, and (4) a top layer bonded to the layer of pressure-sensitive adhesive, said top layer being decorated with solvent sensitive material, said barrier layer being substantially liquid-impervious to solvents which render the solvent-activated adhesive layer adhesively tacky.

2. An adhesive product according to claim 1 wherein the top layer is decorated on its surface in contact with the layer of pressure-sensitive adhesive.

References Cited

UNITED STATES PATENTS

| | | | |
|---|---|---|---|
| 2,042,692 | 6/1936 | Wurzburg | 161—406 |
| 2,079,641 | 5/1937 | Walsh et al. | 156—90 |
| 2,143,600 | 1/1939 | Humphner | 161—167 |
| 2,759,866 | 8/1956 | Seymour. | |
| 2,768,460 | 10/1956 | Northrup | 40—135 |
| 2,986,198 | 5/1961 | Kolker et al. | 161—212 |
| 3,075,863 | 1/1963 | Frey | 156—90 |
| 3,096,202 | 7/1963 | Von Arx | 117—68.5 |
| 3,106,032 | 10/1963 | Morgan | 40—2 |
| 3,117,045 | 1/1964 | Schwickert | 40—125 X |

JACOB H. STEINBERG, *Primary Examiner.*

EARL M. BERGERT, ALEXANDER WYMAN,
*Examiners.*

R. J. ROCHE, *Assistant Examiner.*